United States Patent [19]

Carre et al.

[11] 4,301,653
[45] Nov. 24, 1981

[54] TANDEM MASTER CYLINDER

[75] Inventors: Jean-Jacques Carre, Montreuil; Jean-Marc Cheron, Longperrier, both of France

[73] Assignee: Societe Anonyme D.B.A., Paris, France

[21] Appl. No.: 87,851

[22] Filed: Oct. 24, 1979

[51] Int. Cl.³ .............................................. F15B 7/00
[52] U.S. Cl. ...................................... 60/535; 60/561; 60/581; 60/591
[58] Field of Search ................. 60/534, 535, 561, 591, 60/545, 546, 581; 138/45, 46

[56] References Cited

U.S. PATENT DOCUMENTS

| 865,262 | 9/1907 | Michalk | 138/45 |
|---|---|---|---|
| 2,655,002 | 10/1953 | Terhune | 60/546 |
| 3,044,581 | 7/1962 | Lepelletier | 60/581 |
| 3,229,467 | 1/1966 | Lepelletier | 60/561 |
| 3,421,321 | 1/1969 | Lewis | 60/535 |
| 3,431,729 | 3/1969 | Randol | 60/535 |
| 3,572,845 | 3/1971 | Johannesen | 60/591 |
| 3,605,410 | 9/1971 | Herriett | 60/561 |
| 3,708,211 | 1/1973 | Bueler | 60/535 |
| 4,084,377 | 4/1978 | Gaiser | 60/545 |

FOREIGN PATENT DOCUMENTS

| 1780416 | 9/1968 | Fed. Rep. of Germany . |  |
|---|---|---|---|
| 1958540 | 6/1970 | Fed. Rep. of Germany | 60/535 |
| 2426294 | 5/1974 | Fed. Rep. of Germany . |  |
| 1555573 | 1/1969 | France . |  |
| 2005266 | 3/1969 | France | 60/591 |
| 2261913 | 9/1975 | France | 60/534 |

Primary Examiner—Abraham Hershkovitz
Attorney, Agent, or Firm—Paul David Schoenle; Ken C. Decker

[57] ABSTRACT

The tandem master cylinder is provided with an equalizer device comprising a plunger mounted intermediate two chambers which are respectively connected to the two cavities of the master cylinder. At least one of the ducts connecting the master cylinder and the equalizer device is formed with a constriction slowing down the flow of brake fluid so as to permit a pressure buildup in one of the braking circuits, in case of failure of the other circuit, since the very start of the pedal stroke.

2 Claims, 4 Drawing Figures

TANDEM MASTER CYLINDER

The invention relates to a two circuits master cylinder of the kind used in motor-vehicle brake installations.

Some known master cylinders of the aforementioned kind have separate parallel bores and pistons or have two pistons in line, mounted in tandem in a single bore. In case of failure of one of the two circuits, the aforementioned systems have a serious disadvantage in that the brake pedal wastes part of its stroke, corresponding to the volume of the cavity in the faulty circuit; during this wasted stroke, the brakes cannot be applied to the intact circuit and the driver undergoes a "paralysing" effect owing to the lack of response by the pedal.

This waste of stroke can be reduced by using an adjoining equalizer device as described in French Pat. No. 2 005 266, where the wasted stroke corresponds to the volume of an adjoining chamber which is considerably smaller than either of the main cavities of the master cylinder. However, there is a still waste of stroke even though reduced. As is known, a driver is so used to the normal responses of his vehicle that the least change therein will disturb him.

The invention, therefore, relates mainly to a tandem master cylinder wherein two pistons rigidly associated with one another and with a control rod compress the brake fluid into two corresponding cavities connected (a) to the cylinders of the front wheel and back wheel respectively of a motor vehicle and (b) to an equalizer device, hydraulic ducts connecting the cavities of the master cylinder to the chambers defined in the casing of the equalizer device on either side of a plunger, which if required is associated with a pressure unbalance indicator, characterized in that at least one of the hydraulic ducts is formed with a constriction slowing down the flow of brake fluid.

The result of the aforementioned feature, i.e. the insertion of a constriction in at least one of the connecting ducts between the master cylinder and the equalizing device, is that if one of the two brake circuits fails, the flow of fluid will be slowed down by the constriction, which will result in a temporary back-pressure in the unaffected circuit, so that the brakes can immediately be actuated and that a reaction force will be correspondingly felt by the driver.

Accordingd to another feature of the invention, the aforementioned constriction is formed in a plug axially movable relative to the casing of the equalizer device, the plug being positionable so that the constriction is opposite the connecting duct to the corresponding cavity in the master cylinder, the axial movement of the plug away from the plunger being sufficient to uncover the duct when the master cylinder is drained. Of course, when the connecting duct is uncovered, it is easier to drain the system.

The invention will now be described by way of example with reference to the accompanying drawings in which.

Figure 1:
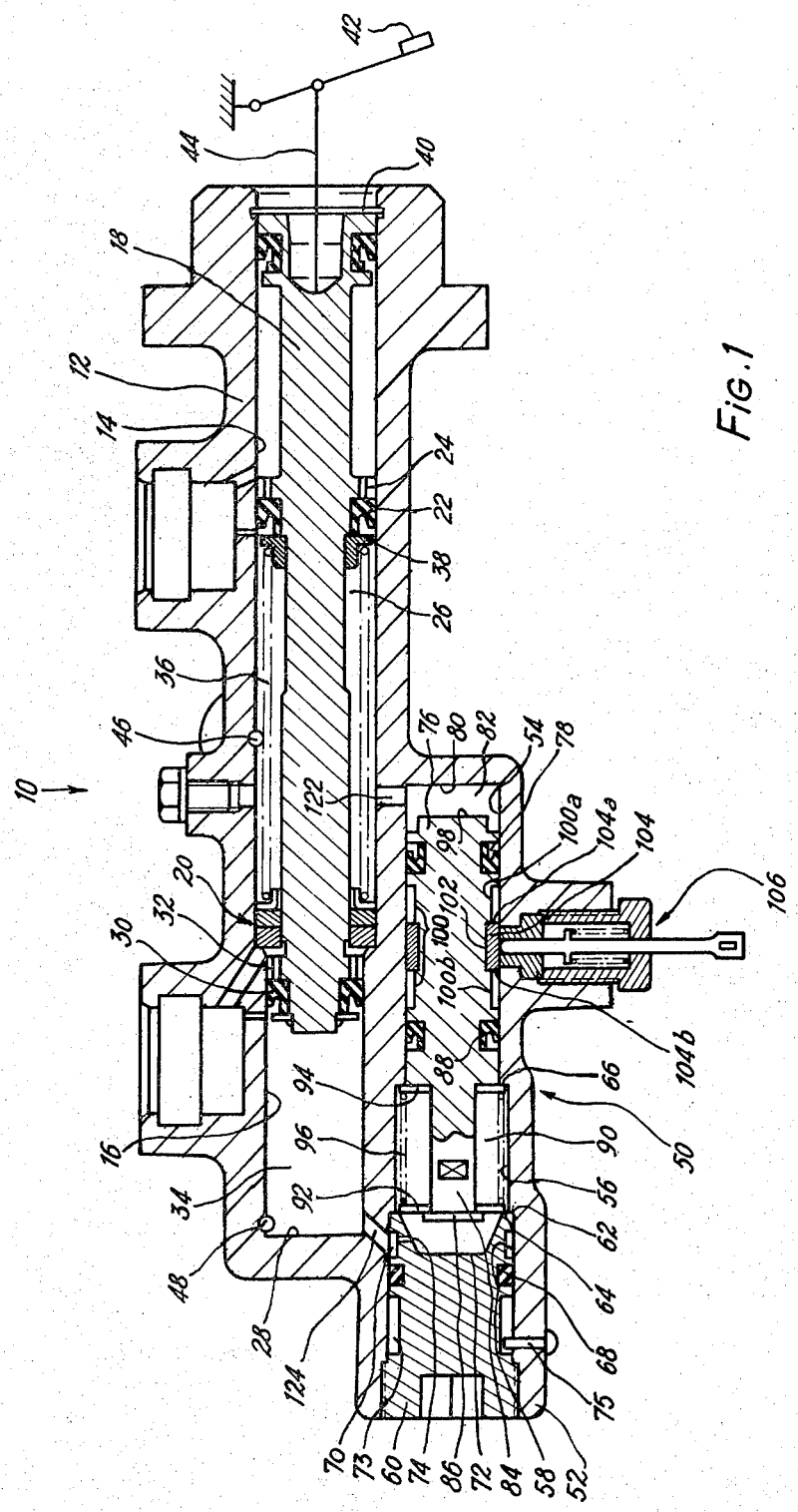
FIG. 1 is a longitudinal section through a tandem master cylinder and the associated equalizer device, according to the invention, in the inoperative position.

Referring to FIG. 1, a tandem master cylinder denoted by the general reference 10 comprises a casing 12 formed with two coaxial bores 14 and 16. A stepped piston 18 is slidably mounted in casing 12. Piston 18, a set of butt joints 20, bore 14 and a seal 22 pressed against a shoulder 24 of piston 18 bound a first cavity 26. Piston 18, the end 28 of casing 12, bore 16 and a seal 30 pressed against a shoulder 32 of piston 18 bound a second cavity 34. A spring 36, mounted between the set of butt joints 20 and a shoulder 38 secured to piston 18, urges piston 18 against a stop 40 secured to casing 12. A pedal 42 associated with a rod 44 is adapted to move piston 18 against spring 36 when actuated by the driver. Cavity 26 is connected by an orifice 46 to a supply circuit supplying brake motors associated with the front wheels of the motor vehicle (not shown). Cavity 34 is connected by an orifice 48 to a supply circuit supplying the brake motors associated with the rear wheels of the vehicle (also not shown). The dimensions of piston 18 and bores 14 and 16 are such that to any movement of piston 18 corresponds an identical variation in the volume of chambers 26 and 34.

That tandem master cylinder 10 is associated with an equalizer device denoted by reference 50. The equalizer device comprises a casing 52. The casing is formed with three coaxial bores 54, 56, 58 and its left end is threaded to receive a threaded plug 60. Plug 60 abuts tightly against a shoulder 62 separating bores 56 and 58 and itself defines a re-entrant shoulder 64 opposite a shoulder 66 separating bores 54 and 56. The periphery of plug 60, bore 58 and a seal 68 define an annular space 70, either by means of an appropriate clearance or by means of an annular groove in plug 60 or in casing 52. The inner surface 72 of plug 60 is recessed, and a small-diameter bore 74 connects the interior of the recess to the annular space 70. An annular groove 73 is formed at the periphery of plug 60, and a stud 75 in a bore in the casing engages groove 73 and thus, for reasons which will be explained hereinafter, limits the axial motion of plug 62 during unscrewing. A piston 76 is slidably mounted in bore 54. Piston 76, a seal 78, bore 54 and the end 80 of casing 52 define a first chamber 82. Facing plug 60, piston 76 has a projection 84 smaller in diameter than and coaxial with piston 76. Projection 84 terminates in a flange 86. Plug 60, bore 56, piston 76, projection 84 and a seal 88 define a second chamber 90. Two washers 92 and 94 are mounted on projection 84 and slide internally along the projection 84 and externally along bore 56. A compression spring 96 is placed between washers 92 and 94. The length of the projection between piston body 76 and flange 86 is equal to the distance between shoulders 64 and 66, and consequently the piston, when inoperative, is in the position shown in FIG. 1, in which washer 92 bears on shoulder 64 and on flange 86 and washer 94 bears on shoulder 66 and on piston body 76. After leaving the inoperative position, the piston can move either towards the right, compressing spring 96 via washer 92, to a limit position where the right end 98 of piston 76 abuts end 80 of casing 52, or to the left, compressing spring 96 via washer 94, to a limit position where flange 86 abuts inner surface 72 of plug 60. The dimensions of the various components are chosen so that the lengths of the two strokes (to the right or to the left) meet predetermined criteria, which are identical in the chosen example.

The central part of piston 76 has a first annular groove 100, and the central part of groove 100 has a second annular groove 102 receiving a collar 104 made of insulating material and substantially larger in diameter than groove 100. Collar 104 has two shoulders 104a and 104b which divide groove 100 into two half-grooves 100a and 100b. The axial lengths of collar 104 is equal to the total travel of the piston.

A locking contact denoted by reference 106 (shown more clearly in FIG. 2) is opposite collar 104. Contact 106 comprises a lug 108 made of conductive material sliding in a guide 110, and also comprises a plug 112, both made of insulating material. The end 114 of lug 108 is rounded and is pressed against the insulating collar 104 by a compression spring 116 bearing at one end on end 118 of plug 112 and at the other end on a shoulder 120 of lug 108. In the inoperative position, end 114 is, in the axial direction with respect to collar 104, in a position such that the piston, after travelling the maximum distance to the right, brings and 114 into engagement in the half-groove 100b, whereas after the piston has travelled the maximum length to the left, it brings the end into engagement in the half-groove 100a. In the example, end 114, when inoperative, is in the middle of collar 104.

Cavity 26 is connected to chamber 82 by a duct 122, and cavity 34 is connected to the annular space 70 by a duct 124 (FIG. 1). The cross-section of orifice 74 is small compared with that of ducts 122 or 124.

The master cylinder according to the invention operates as follows:

FIG. 1 shows the assembly in the inoperative state, when piston 18 bears against collar 40 via spring 36 and piston 76 is in a position such that the end 114 of lug 108 bears against the middle (in the axial direction) of collar 104.

A braking force applied to pedal 42 is transmitted to piston 18 and moves it to the left in FIG. 1. The liquid compressed in cavity 26 by piston 18 is transmitted to the front brake motors via orifice 46, and the liquid compressed in cavity 34 by piston 18 is transmitted to the rear brake motors via orifice 48. Since the same volume of fluid is transmitted to the front circuit and the rear circuit, the pressure is the same in cavities 26 and 34 and consequently in chambers 82 and 90, owing to passages 122 and 124, 70 and 74 respectively. Accordingly, piston 76 remains in the position shown in FIG. 1.

Figure 2:
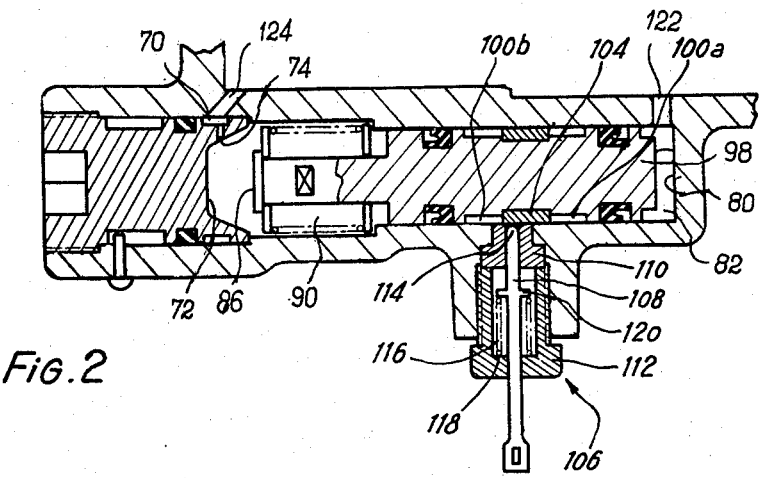
FIG. 2 is a view in section of the position of the equalizer device during normal braking.

For various reasons—e.g. machining tolerances, differences in the absorption of the flexible ducts in the hydraulic circuits, differences in the stroke of the brake pistons, slight leaks, or wear, there may be slight differences in the pressures in cavities 26 and 34. The same difference will occur at chambers 82 and 90 and move piston 76 in a direction for cancelling the difference out. This situation is illustrated in FIG. 2, in which the higher pressure is in cavity 34. As long as this pressure difference remains low, the motion of piston 76 is limited and the behavior of the system does not change.

Figure 3:
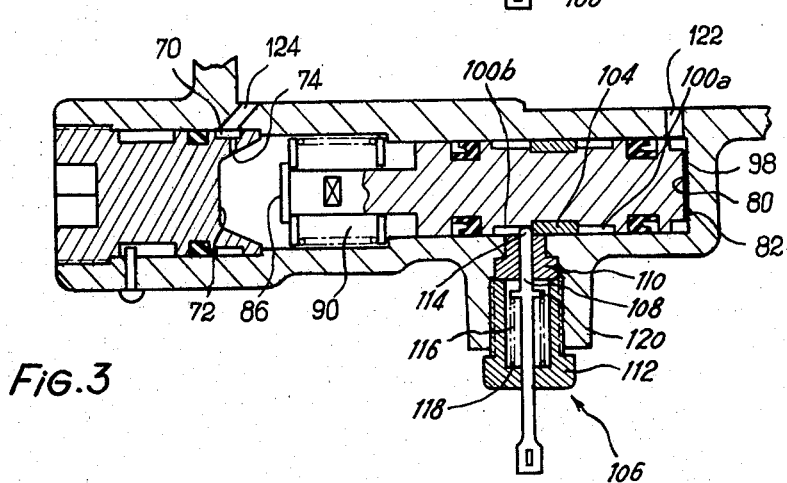
FIG. 3 is a view in section of the position of the equalizer device if one circuit fails.
Figure 4:
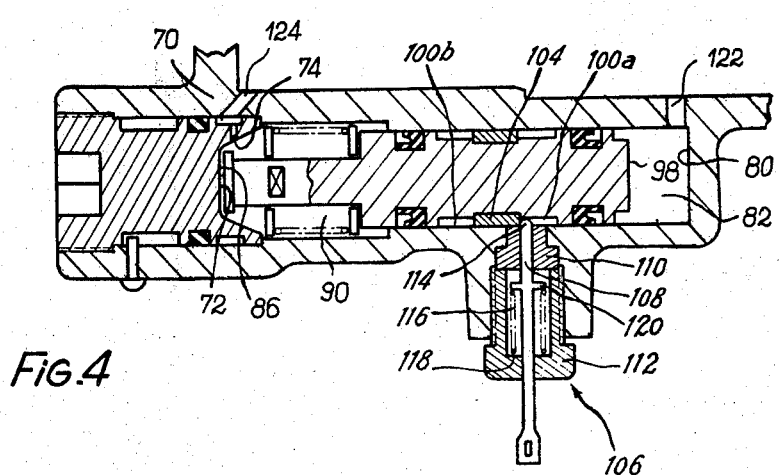
FIG. 4 is a view in section of the position of the equalizer device if the other circuit fails.

If one or the other of the two circuits fails, the device operates as shown in FIGS. 3 and 4.

If the front circuit is faulty (FIG. 3) when a braking force is applied on pedal 42, the pressure in cavity 26 remains zero and is consequently zero in chamber 82. The pressure produced in cavity 34 is transmitted to chamber 90 and moves piston 76 until end 98 abuts end 80 of casing 52. The pressure therefore remains low during the entire travel of piston 76. When the piston reaches the abutment, the pressure in cavity 34 can increase and actuate the rear brake motors. Owing to the absence of pressure in cavity 26, all the braking force is applied to the fluid in chamber 34, i.e. to the rear brake motors, which thus have practically twice the braking capacity. The stroke of pedal 42 necessary for bringing piston 76 into abutment is usually wasted in similar known systems, which have the following two serious disadvantages:

(1) No braking can occur during the wasted stroke, and (2) The absence of response by the system worries the driver, since he does not know, or has forgotten, that the pedal has to be further pressed in order to brake the vehicle.

The invention obviates these two disadvantages owing to the following process. The liquid flowing to chamber 90 as a result of the fault in the front circuit is forced to travel through an orifice 74 having a small cross-section and hereinafter called a "constriction", which considerably reduces the flow speeds. Consequently, a certain pressure builds up cavity 34 as soon as pedal 42 begins to move. This pressure has two effects: It supplies the rear brake motors with sufficient pressure to come into operation, and it transmits a response to the mechanism, showing the driver that his action is effective.

FIG. 4 illustrates the operation in the case where the rear circuit is faulty. A pressure occuring in cavity 26 causes the liquid in chamber 90 to flow towards cavity 34, which is at zero pressure. Constriction 74 slows down the fluid from chamber 90 to cavity 34, so that a brake pressure can build up in the front circuit and there is a response to the driver's pedal 42.

In addition, in both cases, when piston 76 arrives at the end of its stroke, end 114 of lug 108 comes away from the insulating collar 104 and comes into contact with the piston body 76 in half-groove 100a (FIG. 4) or 100b (FIG. 3), thus providing an electric contact for indicating that one of the two circuits is faulty.

Another important feature is that end 114 of lug 108, when engaged in groove 100a or 100b, also engages shoulder 104a or 104b, respectively, in the insulating collar, thus preventing piston 76 from returning to its starting position and maintaining it in an unbalanced position. Since the piston has been moved to one of its two abutment positions during the first braking action, the movement will not be repeated as soon as pedal 42 begins to move.

When the fault has been repaired, it is only necessary to pull lug 108 out of groove 100a and 100b in which its end 114 was engaged, so to release piston 76, which will automatically be recentred by spring 96.

Finally, chamber 90 can be drained, either when put in to operation or during repairs, by unscrewing plug 60 to a limit position defined by stud 75. The axial motion during unscrewing in sufficient to connect chamber 90 directly to cavity 34 via duct 124. After draining, plug 60 is screwed up to the position in which it is shown in FIG. 1. In the absence of this feature, it would be very difficult to drain chamber 90 via constriction 74.

We claim:

1. A tandem master cylinder wherein two pistons rigidly associated with one another and with a control rod compress the brake fluid into two corresponding cavities connected (a) to the cylinders of the front wheel and back wheel respectively of a motor vehicle and (b) to an equalizer device having a casing with a plunger movably disposed therein, said casing and plunger cooperating to define a pair of chambers, hydraulic ducts connecting the cavities of the master cylinder to the chambers defined in the casing of the equalizer device on either side of the plunger, which if required is associated with a pressure unbalance indicator, characterized in that at least one of the hydraulic ducts is formed with a constriction slowing down the flow of brake fluid, said constriction being formed in a plug axially movable relative to the casing of the equalizer device, the plug being positionable so that the constriction is opposite the connecting duct to the corresponding cavity in the master cylinder, the axial movement of the plug away from the plunger being sufficient to uncover the duct when the master cylinder is drained.

2. A tandem master cylinder according to claim 1, characterised in that said master cylinder comprises an abutment limiting the axial movement of the plug to the distance required for uncovering the duct.

* * * * *